(12) United States Patent
Sawanishi et al.

(10) Patent No.: US 12,447,549 B2
(45) Date of Patent: *Oct. 21, 2025

(54) RESISTANCE SPOT WELDING METHOD AND WELD MEMBER PRODUCTION METHOD

(71) Applicant: JFE STEEL CORPORATION, Tokyo (JP)

(72) Inventors: Chikaumi Sawanishi, Tokyo (JP); Yasuaki Okita, Tokyo (JP); Hiroshi Matsuda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 864 days.

This patent is subject to a terminal disclaimer.

(21) Appl. No.: 17/754,517

(22) PCT Filed: Oct. 6, 2020

(86) PCT No.: PCT/JP2020/037916
§ 371 (c)(1),
(2) Date: Apr. 5, 2022

(87) PCT Pub. No.: WO2021/070836
PCT Pub. Date: Apr. 15, 2021

(65) Prior Publication Data
US 2023/0124228 A1 Apr. 20, 2023

(30) Foreign Application Priority Data
Oct. 9, 2019 (JP) .................................. 2019-186405

(51) Int. Cl.
*B23K 11/11* (2006.01)
*B23K 11/25* (2006.01)
*B23K 103/04* (2006.01)

(52) U.S. Cl.
CPC ............. *B23K 11/115* (2013.01); *B23K 11/25* (2013.01); *B23K 2103/04* (2018.08)

(58) Field of Classification Search
CPC ....... B23K 11/115; B23K 11/11; B23K 11/25; B23K 2103/04; B23K 2101/16
(Continued)

(56) References Cited

U.S. PATENT DOCUMENTS 10,040,145 B2    8/2018   Furusako et al.
10,625,368 B2    4/2020   Sawanishi et al.
(Continued)

FOREIGN PATENT DOCUMENTS

EP    3272451 A1    1/2018
JP    S583792 A    1/1983
(Continued)

OTHER PUBLICATIONS

Nov. 21, 2022, the Extended European Search Report issued by the European Patent Office in the corresponding European Patent Application No. 20875531.4.
(Continued)

*Primary Examiner* — Elizabeth M Kerr
*Assistant Examiner* — Simpson A Chen
(74) *Attorney, Agent, or Firm* — KENJA IP LAW PC (57) ABSTRACT

Provided is a resistance spot welding method wherein main current passage includes two or more electrode force application steps including a first electrode force application step and a second electrode force application step following the first electrode force application step, an electrode force $F_1$ in the first electrode force application step and an electrode force $F_2$ in the second electrode force application step in the main current passage satisfy a relationship $F_1 > F_2$, and an electrode force switching point $T_f$ from the first electrode force application step to the second electrode force appli- (Continued)

cation step in the main current passage is set to satisfy predetermined relational formulas.

8 Claims, 6 Drawing Sheets

(58) Field of Classification Search
USPC .................................................... 219/117.1
See application file for complete search history.

(56) References Cited

U.S. PATENT DOCUMENTS

| | | |
|---|---|---|
| 2018/0281102 A1* | 10/2018 | Sawanishi ............. B23K 11/115 |
| 2020/0361021 A1 | 11/2020 | Furusako et al. |
| 2023/0121205 A1* | 4/2023 | Sawanishi ............. B23K 11/115 |
| | | 219/91.1 |

FOREIGN PATENT DOCUMENTS

| | | |
|---|---|---|
| JP | 2007268604 A | 10/2007 |
| WO | 2014045431 A1 | 3/2014 |
| WO | 2016147551 A1 | 9/2016 |
| WO | 2019124467 A1 | 6/2019 |

OTHER PUBLICATIONS

Dec. 8, 2020, International Search Report issued in the International Patent Application No. PCT/JP2020/037916.

* cited by examiner

RESISTANCE SPOT WELDING METHOD AND WELD MEMBER PRODUCTION METHOD

TECHNICAL FIELD

The present disclosure relates to a resistance spot welding method. The present disclosure is particularly intended to stably ensure a desired nugget diameter without expulsion (splash) regardless of the effect of a disturbance in a sheet combination of three or more overlapping sheets with a high sheet thickness ratio.

BACKGROUND

Overlapping metal sheets, especially overlapping steel sheets, are typically joined by resistance spot welding which is one type of lap resistance welding.

Resistance spot welding is a method of squeezing two or more overlapping steel sheets by a pair of electrodes from above and below and, while applying an electrode force, passing a high welding current between the upper and lower electrodes for a short time to join the steel sheets. With this welding method, heat generated from the resistance to the flow of the high welding current is used to form a spot weld. The spot weld is called a nugget. The nugget results from the overlapping steel sheets melting and solidifying at their contact portion when the current flows through the steel sheets. The steel sheets are spot-joined by the nugget.

The joining strength of the resistance spot weld depends on the nugget diameter. Particularly in the case where high joining strength is required as in automotive parts and the like, it is important to ensure at least a certain nugget diameter.

Typically, in the case where the electrode force and the welding time (current passage time) are constant, the nugget diameter gradually increases as the welding current increases. When the welding current reaches a certain value or more, however, expulsion occurs. Expulsion is a phenomenon in which molten metal splatters between the steel sheets. Expulsion causes variations in nugget diameter and joint tensile strength. This results in unstable weld joint quality.

Regarding the structures of automotive parts, for example, a center pillar has a structure in which a reinforcement is sandwiched between an outer portion and an inner portion. In this structure, three or more metal sheets need to be overlapped and spot welded, unlike in the case of simply spot welding two overlapping metal sheets.

Recent demand to further improve the crashworthiness of automobiles has encouraged increases in the strength and thickness of reinforcements and the like. This often creates the need to spot weld a sheet combination in which an outer portion with small sheet thickness is located on the outer side and an inner portion and a reinforcement each with large sheet thickness are located on the inner side.

Of the metal sheets in the sheet combination, a metal sheet with relatively small sheet thickness is referred to as a thin sheet, and a metal sheet with relatively large sheet thickness as a thick sheet. The same applies hereafter.

In the case where such a sheet combination of three or more overlapping sheets with a high sheet thickness ratio ((the total thickness of the sheet combination)/(the sheet thickness of the thinnest metal sheet in the sheet combination)) is subjected to conventional resistance spot welding using a constant electrode force and welding current, a nugget of a required size is hard to be formed between the outermost thin sheet (i.e. sheet in contact with the electrode tip) and the thick sheet. This tendency is particularly noticeable when the sheet thickness ratio of the sheet combination is more than 3, and further noticeable when the sheet thickness ratio is 5 or more.

This is considered to be because the contact with the electrode tip hinders the increase of the temperature between the outermost thin sheet and the thick sheet.

In detail, the nugget is typically formed by heat generated by volume resistance according to the specific resistance of each steel sheet from near the center between the electrodes. However, the contact with the electrode tip hinders the increase of the temperature between the outermost thin sheet and the thick sheet. Accordingly, the nugget grows large between the thick sheets located near the center between the electrodes before it grows between the thin sheet and the thick sheet. Consequently, molten metal cannot be suppressed by the applied electrode force, and expulsion occurs.

Since the outer portion is required to have formability, mild steel is often used as the thin sheet used in the outer portion. Meanwhile, the inner portion and the reinforcement are strength reinforcing members, and therefore high tensile strength steel sheets are often used as the thick sheets used in these members. In such a sheet combination of thin and thick sheets, the heat generation position tends to be closer to the high tensile strength steel sheet (thick sheet) side with high specific resistance. Moreover, in the case where the metal sheets used are coated steel sheets, coated layers melted at low temperature cause the current path between the steel sheets to expand and the current density to decrease. This further hinders the formation of the nugget between the thin sheet and the thick sheet.

As a resistance spot welding method used for such a sheet combination of three or more overlapping sheets with a high sheet thickness ratio, for example, WO 2014/045431 A1 (PTL 1) proposes "A spot welding method for high strength steel sheets with excellent joint strength, comprising resistance spot welding a plurality of steel sheets overlapped on each other, wherein the plurality of steel sheets are either two steel sheets that each have a tensile strength of 780 MPa or more and 1850 MPa or less and that have a sheet thickness ratio (={the sum of the sheet thicknesses of the steel sheets}/{the sheet thickness of a thinner steel sheet (in the case where the steel sheets have the same sheet thickness, the sheet thickness of one sheet)}) of 2 or more and 5 or less or three steel sheets that are composed of three steel sheets each having a tensile strength of 780 MPa or more and 1850 MPa or less or composed of two steel sheets each having a tensile strength of 780 MPa or more and 1850 MPa or less and one steel sheet located on an outer side of the two steel sheets and having a tensile strength of less than 780 MPa and that have a sheet thickness ratio (={the sum of the sheet thicknesses of the steel sheets}/{the sheet thickness of a thinner steel sheet (in the case where the steel sheets have the same sheet thickness, the sheet thickness of one sheet)}) of 3 or more and 6 or less, the spot welding includes: a first current passage step that is preliminary current passage with an electrode force P1 (kN) and a welding current I1 (kA); and a second current passage step that is main current passage with an electrode force P2 (kN) and a welding current I2 (kA), the electrode forces P1 and P2 are within a range defined by the following formulas (2) and (3):

$$0.5 \leq P2 \leq 3.0 t^{(1/3)} \tag{2}$$

$$1.0 \times P2 < P1 \leq 2.0 \times P2 \tag{3}$$

where t (mm) is an average sheet thickness of the plurality of steel sheets, the welding current I1 is 30% or more and 90% or less of the welding current I2, and the second current passage step starts within 0.1 (s) after the first current passage step ends.

CITATION LIST

Patent Literature

PTL 1: WO 2014/045431 A1

SUMMARY

Technical Problem

In the case where there is a disturbance during welding, such as when a point that has already been welded (hereafter referred to as "existing weld") is present near the current welding point or when the parts to be welded have considerable surface roughness and a contact point of the parts to be welded is present near the welding point, part of the current is shunted into such existing weld or contact point during welding. In this state, even when current passage is performed under a predetermined condition, the current density at the position to be welded which is directly above and below the electrodes decreases, and consequently a nugget of a required diameter cannot be obtained.

Moreover, in the case where the surroundings of the welding point are strongly restrained due to surface roughness, member shape, etc., the sheet gap between the steel sheets increases. This causes a smaller contact diameter of the steel sheets, as a result of which a nugget of a required diameter cannot be obtained or expulsion is facilitated.

With the technique described in PTL 1, in the case where there is a gap between the steel sheets as the parts to be welded, the electrode force in the first step is set to be greater than the electrode force in the second step in order to secure a sufficient contact area between the steel sheets in the first step in the initial stage of current passage.

However, in real operation such as vehicle manufacturing, parts to be welded conveyed one after another are welded continuously. The disturbance state varies among welding positions or parts to be welded, due to the work conditions, the dimensional errors of the parts to be welded, or the like. It is therefore difficult to accurately grasp the disturbance state of the parts to be welded before actually starting welding.

Thus, the technique described in PTL 1 has a problem in that a desired nugget diameter cannot be ensured without expulsion when a greater disturbance than expected occurs.

As mentioned above, the disturbance state varies among welding positions or parts to be welded, due to the work conditions, the dimensional errors of the parts to be welded, or the like. Hence, even if the disturbance state of the parts to be welded can be grasped before welding, it is necessary to set, for each disturbance state, an optimal welding condition based on the disturbance state, which is problematic in terms of work efficiency and costs.

It could therefore be helpful to provide a resistance spot welding method that can stably ensure a desired nugget diameter without expulsion regardless of the effect of a disturbance particularly in a sheet combination of three or more overlapping sheets with a high sheet thickness ratio.

It could also be helpful to provide a weld member production method of joining a plurality of overlapping metal sheets by the resistance spot welding method.

Solution to Problem

We conducted intensive study to achieve the object stated above, and discovered the following:

(1) In the case where main current passage for forming a nugget is divided into two or more electrode force application steps and the electrode force in the first electrode force application step is greater than the electrode force in the second electrode force application step, whether a desired current path is ensured, that is, whether a desired heat generation pattern is obtained, can be determined from the time integration value of the resistance between the electrodes from the current passage start of the main current passage to when a predetermined time elapses, regardless of the effect of a disturbance.

(2) Moreover, the effect of the disturbance can be mitigated effectively by setting, depending on the time integration value of the resistance between the electrodes, the timing of switching from the electrode force in the first electrode force application step to the electrode force in the second electrode force application step.

(3) It is therefore possible to stably ensure a desired nugget diameter without expulsion by effectively responding to variations in the disturbance state, even when continuously welding parts to be welded which are conveyed one after another in real operation such as vehicle manufacturing (i.e. even when the disturbance state varies among welding positions or parts to be welded).

The present disclosure is based on these discoveries and further studies.

We thus provide:

1. A resistance spot welding method of squeezing, by a pair of electrodes, parts to be welded which are a plurality of overlapping metal sheets and passing a current while applying an electrode force to join the parts to be welded, wherein main current passage includes two or more electrode force application steps including a first electrode force application step and a second electrode force application step following the first electrode force application step, and an electrode force $F_1$ in the first electrode force application step and an electrode force $F_2$ in the second electrode force application step in the main current passage satisfy a relationship $F_1 > F_2$, and an electrode force switching point $T_f$ from the first electrode force application step to the second electrode force application step in the main current passage is set to satisfy the following Formulas (1) to (3):

in the case where $T_A \leq 0.8 \times T_0$, $$T_A \leq T_f < T_0 \tag{1}$$

in the case where $0.8 \times T_0 < T_A \leq T_0$ or $0.9 \times R_0 \leq R_A \leq R_0$, $$0.9 \times T_0 < T_f \leq 1.1 \times T_0 \tag{2}$$

in the case where $R_A < 0.9 \times R_0$, $$T_0 < T_f \leq T_0 + 2 \times (R_0 - R_A)/R_0 \times T_m \tag{3}$$

where $T_0$ is a reference electrode force switching point from the first electrode force application step to the second electrode force application step, $T_m$ is a total welding time in the main current passage, $R_A$ is a time integration value of a resistance between the electrodes from current passage start of the main current passage to the reference electrode force switching point $T_0$, $R_0$ is a time integration value of a resistance between the electrodes from current passage start to the reference electrode force switching point $T_0$ in the case where current passage is performed under a same condition as the main current passage when the parts to be welded have no disturbance, and $T_A$ is a time at which a time integration value of a resistance between the electrodes in the main current passage reaches $R_0$.

2. The resistance spot welding method according to 1., wherein the reference electrode force switching point $T_0$ satisfies the following formula:

$$0.1 \times T_m \leq T_0 \leq 0.8 \times T_m.$$

3. The resistance spot welding method according to 1. or 2., comprising: performing test welding; and performing actual welding including the main current passage, after the test welding, wherein in main current passage in the test welding, a time variation curve of an instantaneous amount of heat generated per unit volume and a cumulative amount of heat generated per unit volume that are calculated from an electrical property between the electrodes in forming an appropriate nugget by performing current passage by constant current control are stored, and in the main current passage in the actual welding, the time variation curve of the instantaneous amount of heat generated per unit volume and the cumulative amount of heat generated per unit volume that are stored in the main current passage in the test welding are set as a target, and a current passage amount is controlled according to the target.

4. A weld member production method comprising joining a plurality of overlapping metal sheets by the resistance spot welding method according to any one of 1. to 3.

Advantageous Effect

It is thus possible to stably ensure a desired nugget diameter without expulsion regardless of the effect of a disturbance even in a sheet combination of three or more overlapping sheets with a high sheet thickness ratio.

It is also possible to stably ensure a desired nugget diameter by effectively responding to variations in the disturbance state, even when continuously welding parts to be welded which are conveyed one after another in real operation such as vehicle manufacturing (i.e. even when the disturbance state varies among welding positions or parts to be welded). This is very advantageous in improving the operating efficiency and the yield rate.

DETAILED DESCRIPTION

One of the disclosed embodiments will be described below.

One of the disclosed embodiments is a resistance spot welding method of squeezing, by a pair of electrodes, parts to be welded which are a plurality of overlapping metal sheets and passing a current while applying an electrode force to join the parts to be welded, wherein main current passage includes two or more electrode force application steps including a first electrode force application step and a second electrode force application step following the first electrode force application step, an electrode force $F_1$ in the first electrode force application step and an electrode force $F_2$ in the second electrode force application step in the main current passage satisfy a relationship $F_1 > F_2$, and an electrode force switching point $T_f$ from the first electrode force application step to the second electrode force application step in the main current passage (hereafter also referred to as "electrode force switching point $T_f$") is set to satisfy a predetermined relationship.

The electrode force switching point $T_f$ (and the below-described reference electrode force switching point $T_0$) is the time at which the electrode force switching operation starts.

The electrode force switching point $T_f$ (and the below-described reference electrode force switching point $T_0$) is expressed relative to the current passage start point of the main current passage (i.e. expressed as the time elapsed from the current passage start point of the main current passage).

The same applies to the below-described $T_A$ (the time at which the time integration value of the resistance between the electrodes in the main current passage reaches $R_0$), etc.

The resistance spot welding method according to one of the disclosed embodiments is particularly suitable for a sheet combination whose sheet thickness ratio ((the total thickness of the sheet combination)/(the sheet thickness of the thinnest metal sheet in the sheet combination)) is more than 3 and further suitable for a sheet combination whose sheet thickness ratio is 5 or more, for which it has been difficult to obtain a nugget of a required size between thin and thick sheets without expulsion regardless of a disturbance. The resistance spot welding method is effective for a sheet combination of two overlapping sheets as well.

The term "thin sheet" means a metal sheet with relatively small sheet thickness and the term "thick sheet" means a metal sheet with relatively large sheet thickness, of the steel sheets used in the sheet combination. The sheet thickness of a thin sheet is not greater than ¾ of that of a metal sheet (thick sheet) with the largest sheet thickness.

Any welding device that includes a pair of upper and lower electrodes and is capable of freely controlling each of the electrode force and the welding current during welding may be used in the resistance spot welding method according to one of the disclosed embodiments. The type (stationary, robot gun, etc.), the electrode shape, and the like are not limited.

The resistance spot welding method according to one of the disclosed embodiments will be described below.

(A) Main current passage (also referred to as "main current passage in actual welding" in order to be distinguished from main current passage in test welding (described later). The term "main current passage" when used alone denotes the main current passage in the actual welding and not the main current passage in the test welding. Herein, the "main current passage" denotes current passage for forming a nugget. The "actual welding" denotes a process of actually welding parts to be welded, which is to be distinguished from the test welding.)

For a sheet combination of three or more overlapping sheets with a high sheet thickness ratio, by dividing the main current passage for nugget formation into two or more electrode force application steps and satisfying the following relationship, i.e. setting the electrode force $F_1$ in the first electrode force application step (hereafter also simply referred to as "$F_1$") to be greater than the electrode force in the second electrode force application step (hereafter also simply referred to as "$F_2$"), the contact diameter between the metal sheets as the parts to be welded can be ensured more advantageously as mentioned earlier:

$$F_1 > F_2.$$

Preferably, $F_1 \geq 1.1 \times F_2$. More preferably, $F_1 \geq 1.2 \times F_2$. Further preferably, $F_1 \geq 1.5 \times F_2$.

$F_1$ and $F_2$ may be set as appropriate depending on the materials, thicknesses, etc. of the metal sheets as the parts to be welded, as long as the foregoing relationship is satisfied.

For example, in the case of using a sheet combination of three or more overlapping sheets with a high sheet thickness ratio (e.g. a sheet combination of three overlapping sheets composed of two thick sheets (mild steel or 490 MPa to 2000 MPa-grade zinc or zinc alloy coated steel sheets or non-coated steel sheets of 0.8 mm to 3.0 mm in thickness) and one thin sheet (zinc or zinc alloy coated steel sheet or non-coated steel sheet (mild steel) of 0.5 mm to 2.0 mm in thickness), it is preferable that $F_1$ is 2.0 kN to 10.0 kN and $F_2$ is 1.0 kN to 6.0 kN.

In the case of using a typical sheet combination of two overlapping sheets, it is preferable that $F_1$ is 2.0 kN to 7.0 kN and $F_2$ is 1.0 kN to 5.0 kN.

In the resistance spot welding method according to one of the disclosed embodiments, it is important to set the timing of switching from $F_1$ to $F_2$, i.e. the electrode force switching point $T_f$, so as to satisfy the following Formulas (1) to (3), depending on the time integration value of the resistance between the electrodes from the current passage start of the main current passage to when a predetermined time elapses:

in the case where $T_A \leq 0.8 \times T_0$, $$T_A \leq T_f < T_0 \tag{1}$$

in the case where $0.8 \times T_0 < T_A \leq T_0$ or $0.9 \times R_0 \leq R_A \leq R_0$, $$0.9 \times T_0 < T_f < 1.1 \times T_0 \tag{2}$$

in the case where $R_A < 0.9 \times R_0$, $$T_0 < T_f \leq T_0 + 2 \times (R_0 - R_A)/R_0 \times T_m \tag{3}$$

where $T_0$ is the reference electrode force switching point from the first electrode force application step to the second electrode force application step, $T_m$ is the total welding time in the main current passage, $R_A$ is the time integration value of the resistance between the electrodes from the current passage start of the main current passage to the reference electrode force switching point $T_0$, $R_0$ is the time integration value of the resistance between the electrodes from the current passage start to the reference electrode force switching point $T_0$ in the case where current passage is performed under the same condition as the main current passage when the parts to be welded have no disturbance, and $T_A$ is the time at which the time integration value of the resistance between the electrodes in the main current passage reaches $R_0$.

Figure 1:
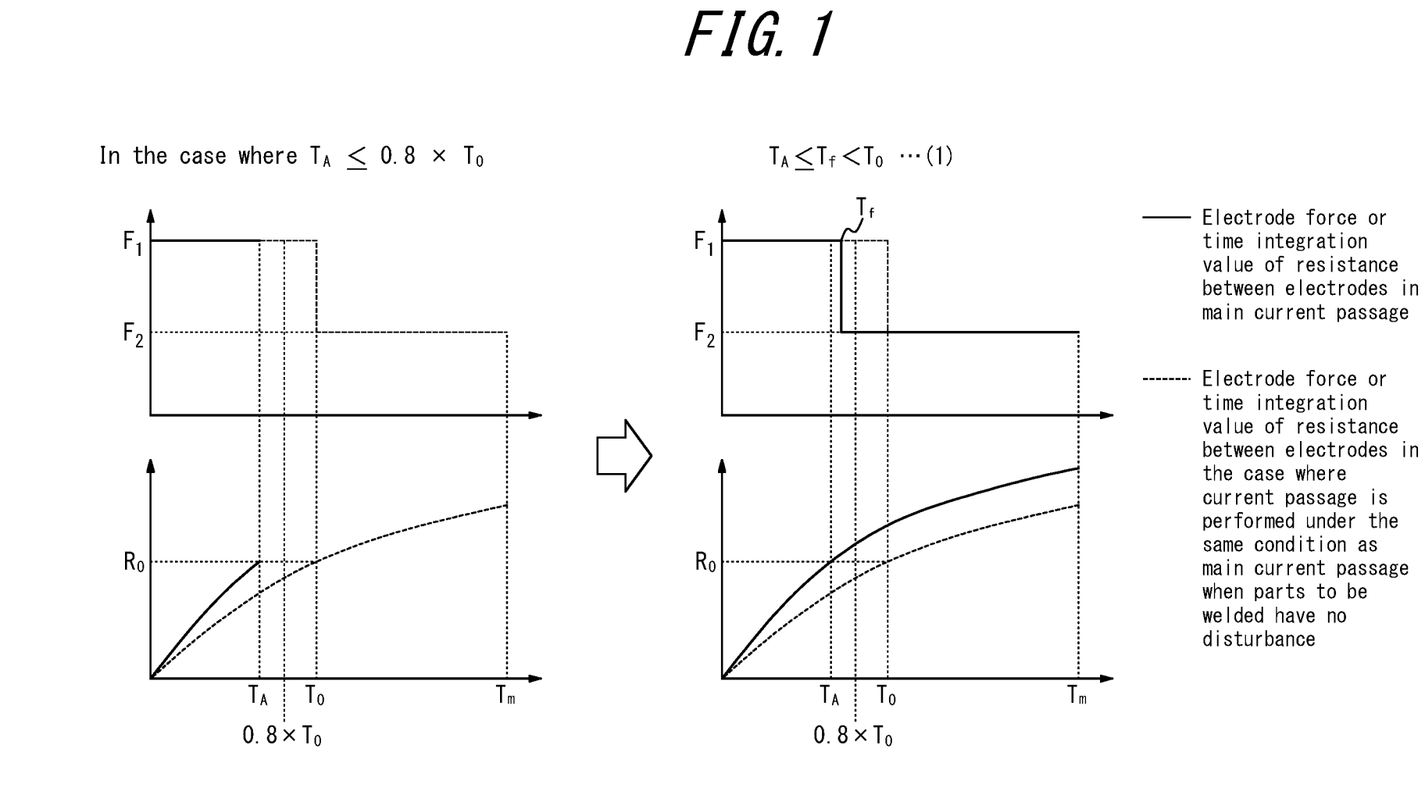
FIG. 1 is a diagram illustrating the relationship between the electrode force and time in main current passage and the relationship between the time integration value of the resistance between the electrodes and time in the main current passage when Formula (1) is satisfied (in the case where $T_A \leq 0.8 \times T_0$) in a resistance spot welding method according to one of the disclosed embodiments.

In the case where $T_A \leq 0.8 \times T_0$, that is, in the case where $R_A$ is expected to be greater than $R_0$ by a certain amount (see FIG. 1), for example when subjecting sheet combinations each having a zinc coated steel sheet on the outer side to continuous welding (hereafter also referred to as "continuous spot welding") using the same electrodes, the electrodes are alloyed with zinc and the surface resistance increases as the number of welding operations increases. In other words, as continuous spot welding progresses, the resistance between the electrodes in each welding operation increases. Actually, however, an increase in the contact area between the electrode and the metal sheet causes the current density to decrease, so that the nugget diameter tends to decrease. In such a case, it is effective to advance the timing of switching from $F_1$ to $F_2$. Specifically, it is effective to set the electrode force switching point $T_f$ so as to satisfy the foregoing Formula (1).

Figure 3:
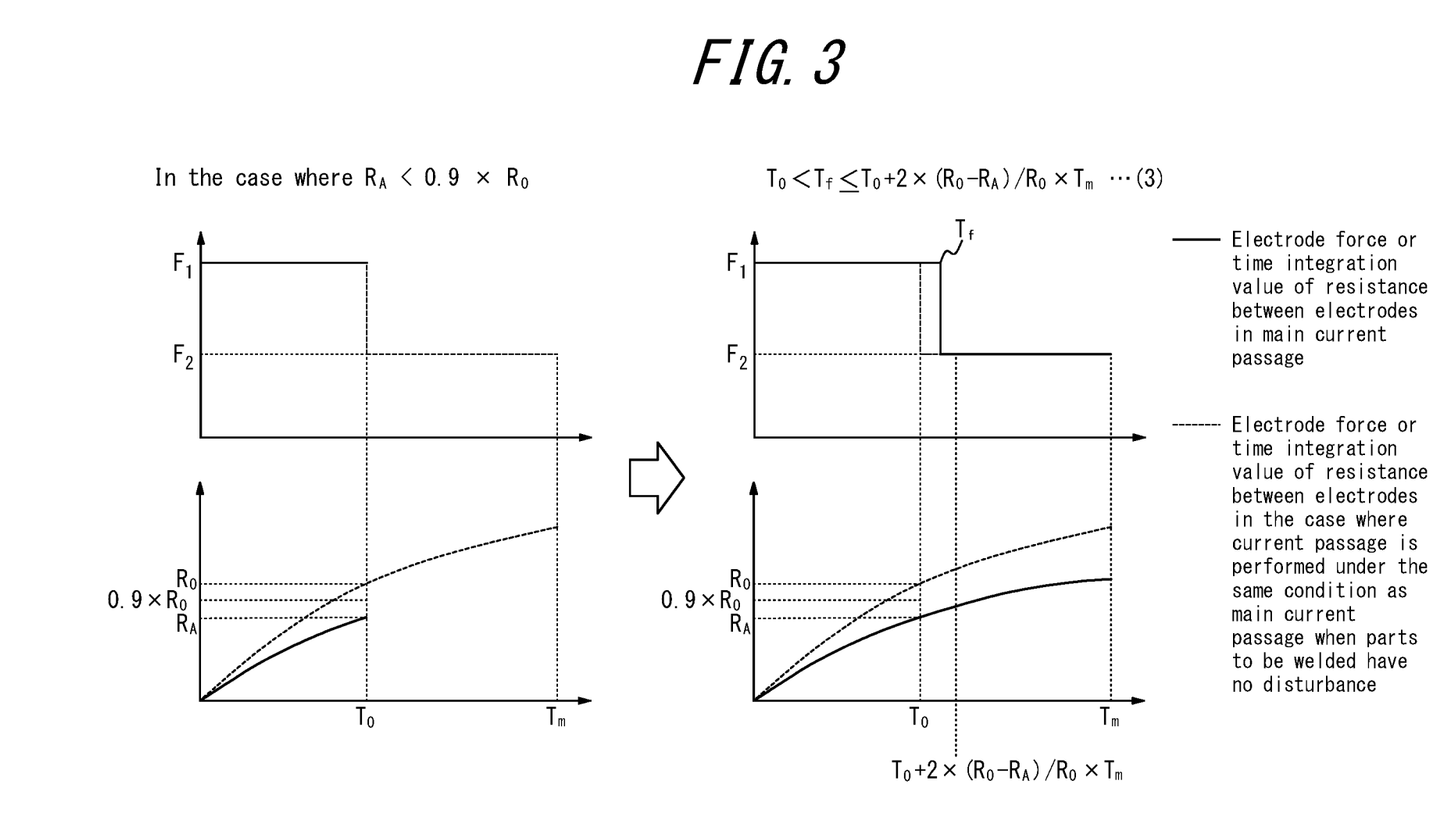
FIG. 3 is a diagram illustrating the relationship between the electrode force and time in the main current passage and the relationship between the time integration value of the resistance between the electrodes and time in the main current passage when Formula (3) is satisfied (in the case where $R_A < 0.9 \times R_0$) in the resistance spot welding method according to one of the disclosed embodiments.

In the case where $R_A < 0.9 \times R_0$, that is, in the case where $R_A$ is less than $R_0$ by a certain amount (see FIG. 3), for example when the metal sheets warp due to a sheet gap (i.e. an electrode force is applied to a sheet combination having a sheet gap by the electrodes and as a result the metal sheets warp due to the sheet gap), the contact area between the electrode and the metal sheet increases and the resistance between the electrodes decreases. However, the contact area between the metal sheets is not sufficient. Switching from $F_1$ to $F_2$ in this state may cause expulsion. In such a case, it is effective to delay the timing of switching from $F_1$ to $F_2$. Specifically, it is effective to set the electrode force switching point $T_f$ so as to satisfy the foregoing Formula (3), to suppress expulsion. This is further effective when current increases in the below-described adaptive control welding or the like.

Figure 2:
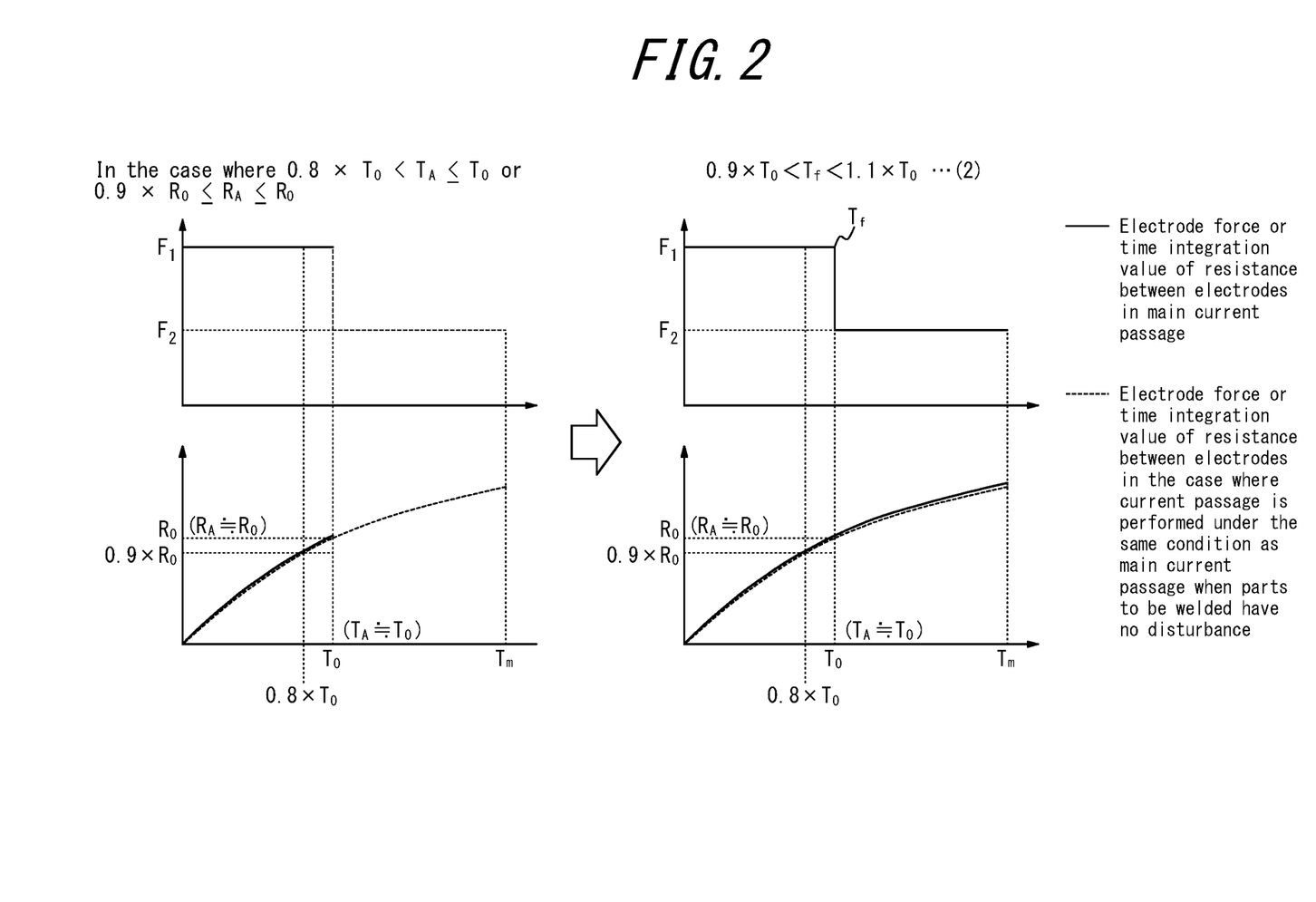
FIG. 2 is a diagram illustrating the relationship between the electrode force and time in the main current passage and the relationship between the time integration value of the resistance between the electrodes and time in the main current passage when Formula (2) is satisfied (in the case where $0.8 \times T_0 < T_A \leq T_0$ or $0.9 \times R_0 \leq R_A \leq R_0$) in the resistance spot welding method according to one of the disclosed embodiments.

In the case where $0.8 \times T_0 < T_A \leq T_0$ or $0.9 \times R_0 \leq R_A \leq R_0$ (see FIG. 2), that is, in the case where $R_A$ is (or is expected to be) approximately equal to $R_0$, the effect of a disturbance is unlikely to be significant. In such a case, the electrode force switching point $T_f$ is set so as to satisfy the foregoing Formula (2).

Thus, in the resistance spot welding method according to one of the disclosed embodiments, it is important to set the electrode force switching point $T_f$ so as to satisfy Formulas (1) to (3) depending on, for example, the time integration value of the resistance between the electrodes from the current passage start of the main current passage to when the predetermined time elapses.

Formulas (1) to (3) are more preferably the following Formulas (1)' to (3)' respectively:

in the case where $T_A \leq 0.8 \times T_0$, $$T_A \leq T_f \leq 0.95 \times T_0 \quad (1)'$$

in the case where $0.8 \times T_0 < T_A \leq T_0$ or $0.9 \times R_0 \leq R_A \leq R_0$, $$0.95 \times T_0 < T_f < 1.05 \times T_0 \quad (2)'$$

in the case where $R_A < 0.9 \times R_0$, $$1.05 \times T_0 \leq T_f \leq T_0 + 2 \times (R_0 - R_A)/R_0 \times T_m \quad (3)'.$$

For example, the time integration value $R_0$ of the resistance between the electrodes from the current passage start to the reference electrode force switching point $T_0$ in the case where current passage is performed under the same condition as the main current passage when the parts to be welded have no disturbance may be obtained by separately preparing parts to be welded composed of metal sheets of the same sheet thicknesses and materials as in the main current passage and having no disturbance and conducting a preliminary welding test of welding the parts to be welded under the same condition as the main current passage.

In the case of performing the below-described test welding, the time integration value of the resistance between the electrodes from the current passage start to the reference electrode force switching point $T_0$ in the main current passage in the test welding may be $R_0$.

The reference electrode force switching point $T_0$ (ms) from the first electrode force application step to the second electrode force application step may be set as appropriate depending on, for example, the materials and thicknesses of the metal sheets as the parts to be welded, but is preferably set using the total welding time $T_m$ (ms) in the main current passage so as to satisfy the following formula:

$$0.1 \times T_m \leq T_0 \leq 0.8 \times T_m.$$

If $T_0$ is less than $0.1 \times T_m$, there is a possibility that the effect of a disturbance cannot be mitigated effectively by controlling the electrode force switching timing. If $T_0$ is more than $0.8 \times T_m$, too, there is a possibility that the effect of a disturbance cannot be mitigated effectively by controlling the electrode force switching timing. $T_0$ is therefore preferably $0.1 \times T_m$ or more and $0.8 \times T_m$ or less.

$T_0$ is more preferably $0.2 \times T_m$ or more, and further preferably $0.3 \times T_m$ or more. $T_0$ is more preferably $0.75 \times T_m$ or less, and further preferably $0.7 \times T_m$ or less.

The total welding time $T_m$ (ms) in the main current passage may be set as appropriate depending on, for example, the materials and thicknesses of the metal sheets as the parts to be welded.

For example, in the case of using a sheet combination of three or more overlapping sheets with a high sheet thickness ratio as mentioned above, $T_m$ is preferably 120 ms to 1000 ms. In the case of using a typical sheet combination of two overlapping sheets, $T_m$ is preferably 80 ms to 800 ms.

In the case where the main current passage is divided into two or more current passage steps and a cooling time is provided between the current passage steps, the total welding time in the main current passage includes the cooling time between the current passage steps.

The main current passage may be performed by constant current control. Alternatively, after performing the below-described test welding, adaptive control welding of controlling the current passage amount according to the target set in the test welding may be performed.

In the case of constant current control, the welding current may be set as appropriate depending on, for example, the materials and thicknesses of the metal sheets as the parts to be welded. The main current passage may be divided into two or more current passage steps, and a cooling time may be provided between the current passage steps.

The timing of dividing the current passage may be the same as or different from the timing of dividing the electrode force application. The point of switching the current value from the first current passage step to the second current passage step (i.e. the timing of dividing the current passage) in the main current passage need not be changed according to the change of the electrode force switching point in the main current passage. The same applies to the below-described adaptive control welding.

For example, in the case of welding a typical sheet combination of two overlapping sheets by one current passage step, the current value is preferably 4.0 kA to 12.0 kA.

In the case of performing welding by two or more current passage steps obtained by dividing the current passage, it is preferable that the current value and the welding time in the first current passage step are 3.0 kA to 12.0 kA and 40 ms to 800 ms respectively and the current value and the welding time in the second current passage step are 4.0 kA to 14.0 kA and 20 ms to 400 ms respectively. Particularly in the case of welding a sheet combination of three or more overlapping sheets with a high sheet thickness ratio as mentioned above, it is preferable that the current value in the first current passage step is less than the current value in the second current passage step. In the case where a cooling time is provided between the first current passage step and the second current passage step, the cooling time is preferably 10 ms to 400 ms.

In the case of adaptive control welding, welding is performed according to the target (the time variation curve of the instantaneous amount of heat generated per unit volume and the cumulative amount of heat generated) obtained as a result of the below-described test welding. If the amount of time variation of the instantaneous amount of heat generated per unit volume follows the time variation curve, the welding is continued without change and completed. If the amount of time variation of the instantaneous amount of heat generated per unit volume differs from the time variation curve, the current passage amount is controlled in order to compensate for the difference within a remaining welding time so that the cumulative amount of heat generated per unit volume in the actual welding matches the cumulative amount of heat generated per unit volume set as the target.

In the case of adaptive control welding, too, the main current passage may be divided into two or more current passage steps, and adaptive control welding may be performed for each current passage step.

In detail, the main current passage in the actual welding and the main current passage in the test welding are each divided into two or more current passage steps so as to correspond to each other.

Welding is then performed according to the target (the time variation curve of the instantaneous amount of heat generated per unit volume and the cumulative amount of heat generated) for each current passage step obtained as a result of the test welding. If the amount of time variation of the instantaneous amount of heat generated per unit volume differs from the time variation curve in any current passage step, the current passage amount is controlled in order to compensate for the difference within a remaining welding time in the current passage step so that the cumulative amount of heat generated per unit volume in the current passage step matches the cumulative amount of heat generated per unit volume in the current passage step in the test welding.

The method of calculating the amount of heat generated is not limited. JP H11-33743 A discloses an example of the method, which may be used herein. The following is the procedure of calculating the amount q of heat generated per unit volume and per unit time and the cumulative amount Q of heat generated per unit volume according to this method.

Let t be the total thickness of the parts to be welded, r be the electrical resistivity of the parts to be welded, V be the voltage between the electrodes, I be the welding current, and S be the contact area of the electrodes and the parts to be welded. In this case, the welding current passes through a columnar portion whose cross-sectional area is S and thickness is t, to generate heat by resistance. The amount q of heat generated per unit volume and per unit time in the columnar portion is given by the following Formula (4):

$$q=(V \cdot I)/(S \cdot t) \qquad (4).$$

The electrical resistance R of the columnar portion is given by the following Formula (5):

$$R=(r \cdot t)/S \qquad (5).$$

Solving Formula (5) for S and substituting the solution into Formula (4) yields the amount q of heat generated as indicated by the following Formula (6):

$$q=(V \cdot I \cdot R)/(r \cdot t^2)=(V^2)/(r \cdot t^2) \qquad (6).$$

As is clear from Formula (6), the amount q of heat generated per unit volume and per unit time can be calculated from the voltage V between the electrodes, the total thickness t of the parts to be welded, and the electrical resistivity r of the parts to be welded, and is not affected by the contact area S of the electrodes and the parts to be welded. Although the amount of heat generated is calculated from the voltage V between the electrodes in Formula (6), the amount q of heat generated may be calculated from the interelectrode current I. The contact area S of the electrodes and the parts to be welded need not be used in this case, either. By cumulating the amount q of heat generated per unit volume and per unit time for the welding time, the cumulative amount Q of heat generated per unit volume for the welding is obtained. As is clear from Formula (6), the cumulative amount Q of heat generated per unit volume can also be calculated without using the contact area S of the electrodes and the parts to be welded.

Although the above describes the case of calculating the cumulative amount Q of heat generated by the method described in JP H11-33743 A, the cumulative amount Q may be calculated by any other method.

(B) Test Welding

In the case of performing the main current passage in the actual welding by adaptive control welding, the test welding is performed before the actual welding. In the main current passage in the test welding, the time variation curve of the instantaneous amount of heat generated per unit volume and the cumulative amount of heat generated per unit volume that are calculated from the electrical property between the electrodes in forming an appropriate nugget by performing current passage by constant current control are stored.

In detail, in the test welding, a preliminary welding test with the same steel types and thicknesses as the parts to be welded in the actual welding is performed with various conditions by constant current control in a state without a sheet gap or current shunting to an existing weld, to find an optimal condition in the test welding.

Current passage is then performed under this condition, and the time variation curve of the instantaneous amount of heat generated per unit volume and the cumulative amount of heat generated per unit volume that are calculated from the electrical property between the electrodes during the current passage are stored as the target in the actual welding. Herein, the "electrical property between the electrodes" means the resistance between the electrodes or the voltage between the electrodes.

The main current passage in the test welding may be divided into two or more current passage steps, and adaptive control welding may be performed for each current passage step in the actual welding, as mentioned above.

In the case of welding a sheet combination of three or more overlapping sheets with a high sheet thickness ratio as mentioned above, it is preferable that the current value in the first current passage step is less than the current value in the second current passage step in the test welding, too.

(C) Other Modifications

Preliminary current passage for stabilizing the contact diameter may be performed before the main current passage (the main current passage in the actual welding and/or the test welding) for nugget formation, and subsequent current passage for subsequent heat treatment may be performed. The preliminary current passage and the subsequent current passage may be performed by constant current control, or performed in an upslope or downslope current pattern.

A cooling time may be provided between the preliminary current passage and the main current passage and between the main current passage and the subsequent current passage.

The parts to be welded are not limited. The resistance spot welding method may be used for welding of steel sheets and coated steel sheets having various strengths from mild steel to ultra high tensile strength steel and light metal sheets of aluminum alloys and the like. The resistance spot welding method may also be used for a sheet combination of three or more overlapping steel sheets.

By joining a plurality of overlapping metal sheets by the resistance spot welding method described above, various weld members, in particular weld members of automotive parts and the like, can be produced while stably ensuring a desired nugget diameter by effectively responding to variations in the disturbance state.

EXAMPLES

The presently disclosed techniques will be described below by way of examples. The conditions in the examples are one example of conditions employed to determine the operability and effects of the presently disclosed techniques, and the present disclosure is not limited to such example of conditions. Various conditions can be used in the present disclosure as long as the object of the present disclosure is fulfilled, without departing from the scope of the present disclosure.

Actual welding (main current passage) was performed for each sheet combination of metal sheets listed in Table 1 under the conditions listed in Tables 3 and 4 in the states illustrated in FIGS. 4A to 6B, to produce weld joints.

Figure 5A:
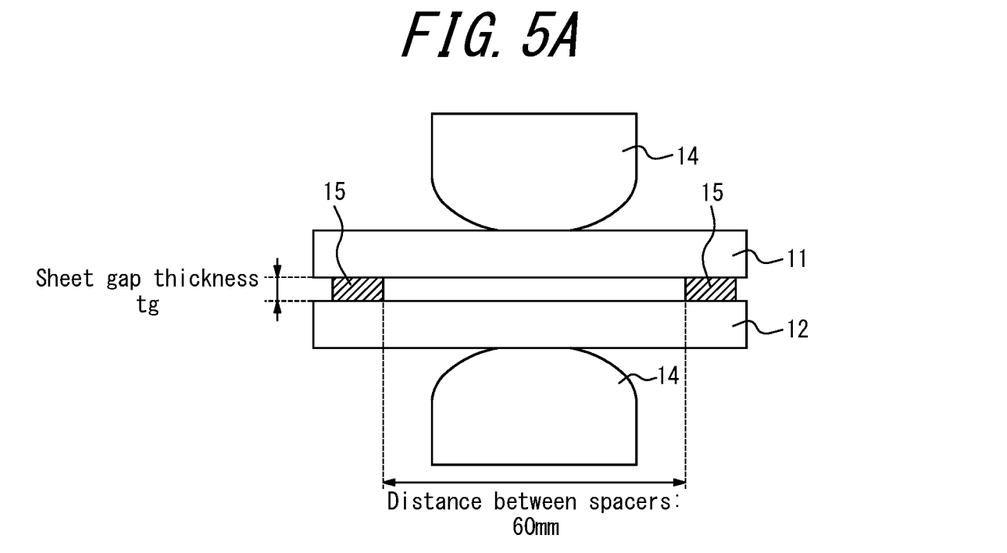
FIG. 5A is a diagram schematically illustrating an example of performing welding on a sheet combination having a sheet gap.
Figure 5B:
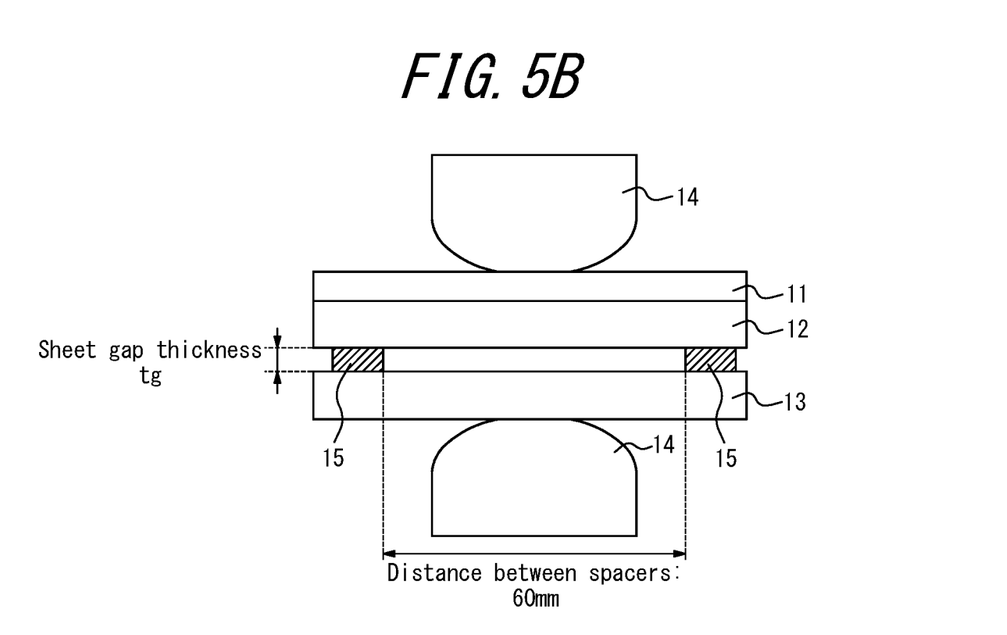
FIG. 5B is a diagram schematically illustrating an example of performing welding on a sheet combination having a sheet gap.

In FIGS. 5A and 5B, spacers 15 were inserted between metal sheets, and a sheet combination was clamped from above and below (not illustrated) to create a sheet gap of any of various thicknesses. The distance between the spacers was 60 mm in each case.

Figure 6A:
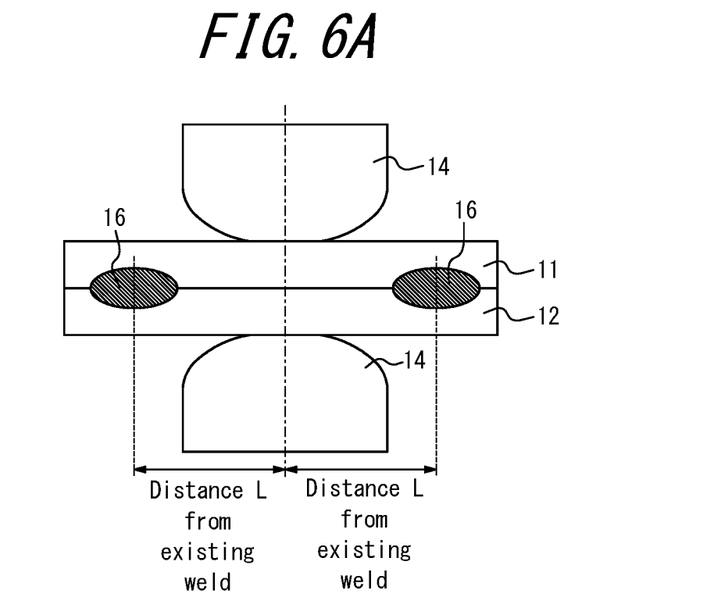
FIG. 6A is a diagram schematically illustrating an example of performing welding on a sheet combination having existing welds.
Figure 6B:
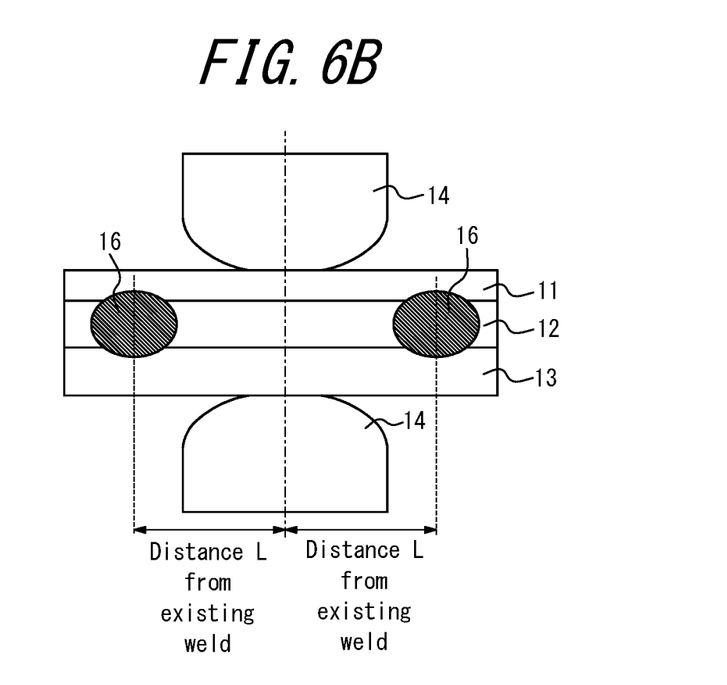
FIG. 6B is a diagram schematically illustrating an example of performing welding on a sheet combination having existing welds.

In FIGS. 6A and 6B, there were two existing welds 16, and the welding position (the center between the electrodes) was adjusted to be a midpoint between the existing welds (i.e. the distance L from each existing weld was equal). The nugget diameter of each existing weld was $4\sqrt{t'}$ (mm) (where t' is the sheet thickness (mm) of the thinnest metal sheet in the sheet combination).

In No. 1-5, to simulate the alloying state of the electrodes and zinc (which occurs when subjecting a sheet combination having a zinc coated steel sheet on the outer side to continuous spot welding), a separately prepared sheet combination having a zinc coated steel sheet on the outer side was resistance spot welded at 1000 points. After this, the electrodes used in the resistance spot welding at 1000 points was used to perform actual welding.

Figure 4A:
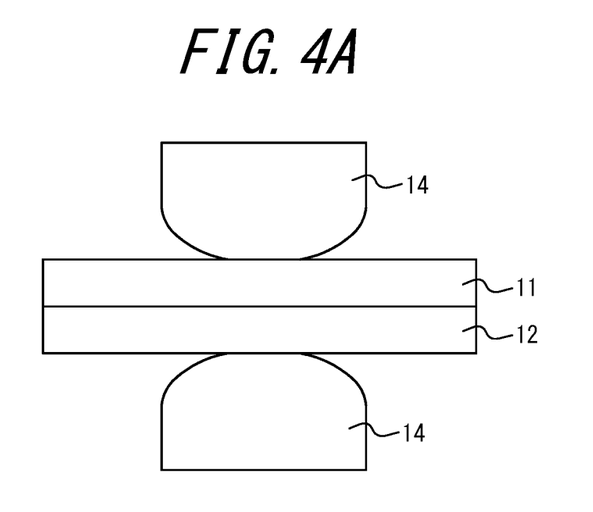
FIG. 4A is a diagram schematically illustrating an example of performing welding in a state of no disturbance.
Figure 4B:
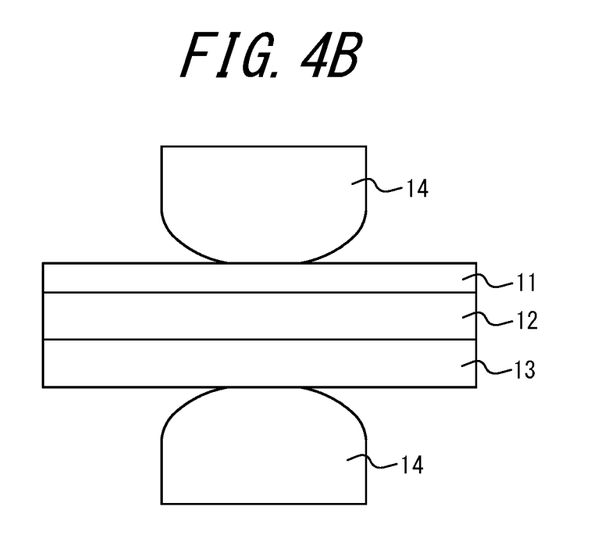
FIG. 4B is a diagram schematically illustrating an example of performing welding in a state of no disturbance.

In some examples, before actual welding, test welding was performed under the conditions listed in Table 2 in a state of no disturbance illustrated in FIGS. 4A and 4B, and the time variation curve of the instantaneous amount of heat generated per unit volume and the cumulative amount of heat generated per unit volume in the main current passage in the test welding were stored. Moreover, the time integration value of the resistance between the electrodes from the current passage start to the reference electrode force switching point $T_0$ in the main current passage in the test welding was measured and taken to be $R_0$.

In each example in which current passage was performed by constant current control, parts to be welded composed of metal sheets of the same sheet thicknesses and materials as in the main current passage and having no disturbance were separately prepared, and a preliminary welding test of welding the parts to be welded under the same condition as the actual welding was performed to obtain $R_0$.

$R_0$ thus obtained is listed in Table 3.

For each produced weld joint, the weld was cut and etched in section, and then observed with an optical microscope to evaluate the weld joint in the following three levels A, B, and F based on the nugget diameter and whether expulsion occurred. For a sheet combination of three overlapping sheets, the evaluation was made using the diameter of a nugget formed between the thinnest metal sheet 11 on the outer side and the metal sheet 12 adjacent to the metal sheet 11. The evaluation results are listed in Table 4.

A: The nugget diameter was $4.5\sqrt{t'}$ (mm) or more (where t' is the sheet thickness (mm) of the thinnest metal sheet in the sheet combination) and no expulsion occurred regardless of a disturbance.

B: The nugget diameter was $4\sqrt{t'}$ (mm) or more and no expulsion occurred regardless of a disturbance (excluding the case A).

F: The nugget diameter was less than $4\sqrt{t'}$ (mm) and/or expulsion occurred depending on a disturbance.

TABLE 1

| Sheet combination ID | Metal sheet of reference sign 11 in the drawings | Metal sheet of reference sign 12 in the drawings | Metal sheet of reference sign 13 in the drawings | $4\sqrt{t'}$ (mm) | $4.5\sqrt{t'}$ (mm) |
|---|---|---|---|---|---|
| A | 270 MPa-grade GA steel sheet (sheet thickness: 0.7 mm) | 1470 MPa-grade GA steel sheet (sheet thickness: 1.6 mm) | 1470 MPa-grade GA steel sheet (sheet thickness: 1.6 mm) | 3.35 | 3.76 |
| B | 270 MPa-grade GA steel sheet (sheet thickness: 0.8 mm) | 1470 MPa-grade cold-rolled steel sheet (sheet thickness: 1.6 mm) | 1470 MPa-grade GA steel sheet (sheet thickness: 1.4 mm) | 3.58 | 4.02 |
| C | 1470 MPa-grade GA steel sheet (sheet thickness: 1.4 mm) | 1470 MPa-grade GA steel sheet (sheet thickness: 1.4 mm) | | 4.73 | 5.32 |

TABLE 2

| | | | | | | Test welding condition | | | | |
|---|---|---|---|---|---|---|---|---|---|---|
| | | | Electrode force application condition | | | Current passage condition | | | | |
| | | | | | | First current passage step | | | Second current passage step | |
| | | Sheet combination ID | $F_1'$*1 (kN) | $F_2'$*2 (kN) | Switching point from $F_1'$ to $F_2'$ (ms) | Current value (kA) | Welding time (ms) | Cooling time (ms) | Current value (kA) | Welding time (ms) | Remarks |
| 1 | 1-1 | A | 5.0 | 3.0 | 160 | 5.0 | 160 | 40 | 6.5 | 200 | Example |
| | 1-2 | | | | | | | | | | |
| | 1-3 | | | | | | | | | | |
| | 1-4 | | | | | | | | | | |
| | 1-5 | | | | | | | | | | |
| 2 | 2-1 | B | | | | | — | | | | Example |
| | 2-2 | | | | | | | | | | |
| | 2-3 | | | | | | | | | | |
| 3 | 3-1 | C | 4.5 | 3.0 | 200 | 7.0 | 200 | — | 7.0 | 120 | Example |
| | 3-2 | | | | | | | | | | |
| | 3-3 | | | | | | | | | | |
| | 3-4 | | | | | | | | | | |
| 4 | 4-1 | A | | | | | — | | | | Comparative Example |
| | 4-2 | | | | | | | | | | |

TABLE 2-continued

| | | Test welding condition | | | | | | | |
|---|---|---|---|---|---|---|---|---|---|
| | | Electrode force application condition | | | Current passage condition | | | | |
| | | | | | First current passage step | | Second current passage step | | |
| No. | Sheet combination ID | $F_1'$*1 (kN) | $F_2'$*2 (kN) | Switching point from $F_1'$ to $F_2'$ (ms) | Current value (kA) | Welding time (ms) | Cooling time (ms) | Current value (kA) | Welding time (ms) | Remarks |
| 4-3 | | | | | | | | | | |
| 4-4 | | | | | | | | | | |

*1: Electrode force in first electrode force application step in main current passage in test welding
*2: Electrode force in second electrode force application step in main current passage in test welding

TABLE 3

| | | | Actual welding condition | | | | | | |
|---|---|---|---|---|---|---|---|---|---|
| | | | | Electrode force switching timing change control | Electrode force application condition | | | | |
| No. | | Sheet combination ID | Disturbance state | | $F_1$ (kN) | $F_2$ (kN) | $T_f$ (ms) | $T_0$ (ms) | $T_m$ (ms) |
| 1 | 1-1 | A | None | Applied | 5.0 | 3.0 | 162 | 160 | 400 |
| | 1-2 | | Sheet gap (tg = 0.5 mm) | | | | 210 | | |
| | 1-3 | | Sheet gap (tg = 1 mm) | | | | 280 | | |
| | 1-4 | | Existing weld (L = 10 mm) | | | | 320 | | |
| | 1-5 | | Alloying of electrodes and Zn | | | | 142 | | |
| 2 | 2-1 | B | None | Applied | 5.5 | 3.0 | 145 | 140 | 380 |
| | 2-2 | | Sheet gap (tg = 0.5 mm) | | | | 220 | | |
| | 2-3 | | Sheet gap (tg = 1 mm) | | | | 260 | | |
| 3 | 3-1 | C | None | Applied | 4.5 | 3.0 | 200 | 200 | 320 |
| | 3-2 | | Sheet gap (tg = 0.5 mm) | | | | 260 | | |
| | 3-3 | | Sheet gap (tg = 1 mm) | | | | 280 | | |
| | 3-4 | | Existing weld (L = 10 mm) | | | | 270 | | |
| 4 | 4-1 | A | None | Not applied | 5.0 | 2.5 | 160 | 160 | 400 |
| | 4-2 | | Sheet gap (tg = 0.5 mm) | | | | 160 | | |
| | 4-3 | | Sheet gap (tg = 1 mm) | | | | 160 | | |
| | 4-4 | | Existing weld (L = 10 mm) | | | | 160 | | |

| | | | Actual welding condition | | | | | | |
|---|---|---|---|---|---|---|---|---|---|
| No. | | $T_0/T_m$ | $T_A$ (ms) | $R_0$ (Ω·ms) | $R_A$ (Ω·ms) | $R_A/R_0$ | Appropriate range of $T_f$ according to Formulas (1) to (3) | | Remarks |
| 1 | 1-1 | 0.40 | 158 | 0.041 | 0.042 | 1.02 | More than 144 to less than 176 | Formula (2) | Example |
| | 1-2 | | 200 | | 0.036 | 0.88 | More than 160 to 258 | Formula (3) | |
| | 1-3 | | 270 | | 0.032 | 0.78 | More than 160 to 336 | Formula (3) | |
| | 1-4 | | 290 | | 0.030 | 0.73 | More than 160 to 375 | Formula (3) | |
| | 1-5 | | 125 | | 0.050 | 1.22 | 125 to less than 160 | Formula (1) | |
| 2 | 2-1 | 0.37 | 142 | 0.038 | 0.036 | 0.95 | More than 126 to less than 154 | Formula (2) | Example |
| | 2-2 | | 210 | | 0.033 | 0.87 | More than 140 to 240 | Formula (3) | |
| | 2-3 | | 240 | | 0.028 | 0.74 | More than 140 to 340 | Formula (3) | |
| 3 | 3-1 | 0.63 | 190 | 0.044 | 0.046 | 1.05 | More than 180 to less than 220 | Formula (2) | Example |
| | 3-2 | | 258 | | 0.039 | 0.89 | More than 200 to 273 | Formula (3) | |
| | 3-3 | | 268 | | 0.037 | 0.84 | More than 200 to 302 | Formula (3) | |
| | 3-4 | | 260 | | 0.038 | 0.86 | More than 200 to 287 | Formula (3) | |
| 4 | 4-1 | 0.40 | 156 | 0.041 | 0.043 | 1.05 | More than 144 to less than 176 | Formula (2) | Comparative Example |
| | 4-2 | | 210 | | 0.035 | 0.85 | More than 160 to 277 | Formula (3) | |
| | 4-3 | | 290 | | 0.031 | 0.76 | More than 160 to 355 | Formula (3) | |
| | 4-4 | | 310 | | 0.029 | 0.71 | More than 160 to 394 | Formula (3) | |

TABLE 4

| | | | First current passage step | | | Second current passage step | | | Evaluation result | | |
|---|---|---|---|---|---|---|---|---|---|---|---|
| No. | Sheet combination ID | Current passage method | Current value (kA) | Welding time (ms) | Cooling time (ms) | Current value (kA) | Welding time (ms) | Nugget diameter (mm) | Expulsion | Evaluation | Remarks |
| 1 1-1 | A | Adaptive control | — | 160 | 40 | — | 200 | 4.0 | Not occurred | A | Example |
| 1-2 | | | | | | | | 4.1 | Not occurred | | |
| 1-3 | | | | | | | | 3.9 | Not occurred | | |
| 1-4 | | | | | | | | 4.1 | Not occurred | | |
| 1-5 | | | | | | | | 4.2 | Not occurred | | |
| 2 2-1 | B | Constant current control | 5.5 | 140 | 60 | 7.0 | 180 | 4.3 | Not occurred | B | Example |
| 2-2 | | | | | | | | 4.2 | Not occurred | | |
| 2-3 | | | | | | | | 3.6 | Not occurred | | |
| 3 3-1 | C | Adaptive control | — | 200 | — | — | 120 | 5.4 | Not occurred | A | Example |
| 3-2 | | | | | | | | 5.4 | Not occurred | | |
| 3-3 | | | | | | | | 5.6 | Not occurred | | |
| 3-4 | | | | | | | | 5.5 | Not occurred | | |
| 4 4-1 | A | Constant current control | 5.0 | 160 | 40 | 6.5 | 200 | 4.0 | Not occurred | F | Comparative Example |
| 4-2 | | | | | | | | 3.3 | Not occurred | | |
| 4-3 | | | | | | | | 3.2 | Occurred | | |
| 4-4 | | | | | | | | 2.9 | Not occurred | | |

In each Example, a sufficient nugget diameter was obtained without expulsion regardless of a disturbance.

In each Comparative Example, a sufficient nugget diameter was not obtained and/or expulsion occurred depending on a disturbance.

REFERENCE SIGNS LIST 11, 12, 13 metal sheet
14 electrode
15 spacer
16 existing weld

The invention claimed is:

1. A resistance spot welding method of squeezing, by a pair of electrodes, parts to be welded which are a plurality of overlapping metal sheets and passing a current while applying an electrode force to join the parts to be welded,
wherein main current passage includes two or more electrode force application steps including a first electrode force application step and a second electrode force application step following the first electrode force application step, and an electrode force $F_1$ in the first electrode force application step and an electrode force $F_2$ in the second electrode force application step in the main current passage satisfy a
relationship $F_1 > F_2$, and an electrode force switching point $T_f$ from the first electrode force application step to the second electrode force application step in the main current passage is set to satisfy the following Formulas (1) to (3):
in the case where $T_A \leq 0.8 \times T_0$, $$T_A \leq T_f < T_0 \quad (1)$$

in the case where $0.8 \times T_0 < T_A \leq T_0$ or $0.9 \times R_0 \leq R_A \leq R_0$, $$0.9 \times T_0 < T_f < 1.1 \times T_0 \quad (2)$$

in the case where $R_A < 0.9 \times R_0$, $$T_0 < T_f \leq T_0 + 2 \times (R_0 - R_A)/R_0 \times T_m \quad (3)$$

where $T_0$ is a reference electrode force switching point from the first electrode force application step to the second electrode force application step, $T_m$ is a total welding time in the main current passage, $R_A$ is a time integration value of a resistance between the electrodes from current passage start of the main current passage to the reference electrode force switching point $T_0$, $R_0$ is a time integration value of a resistance between the electrodes from current passage start to the reference electrode force switching point $T_0$ in the case where current passage is performed under a same condition as the main current passage when the parts to be welded have no disturbance, and $T_A$ is a time at which a time integration value of a resistance between the electrodes in the main current passage reaches $R_0$.

2. The resistance spot welding method according to claim 1, wherein the reference electrode force switching point $T_0$ satisfies the following formula:

$$0.1 \times T_m \leq T_0 \leq 0.8 \times T_m.$$

3. The resistance spot welding method according to claim 1, comprising:
performing test welding; and
performing actual welding including the main current passage, after the test welding,
wherein in main current passage in the test welding, a time variation curve of an instantaneous amount of heat generated per unit volume and a cumulative amount of heat generated per unit volume that are calculated from an electrical property between the electrodes in forming an appropriate nugget by performing current passage by constant current control are stored, and
in the main current passage in the actual welding, the time variation curve of the instantaneous amount of heat generated per unit volume and the cumulative amount of heat generated per unit volume that are stored in the main current passage in the test welding are set as a target, and a current passage amount is controlled according to the target.

4. A weld member production method comprising joining a plurality of overlapping metal sheets by a resistance spot welding method of squeezing, by a pair of electrodes, parts to be welded which are the plurality of overlapping metal sheets and passing a current while applying an electrode force to join the parts to be welded, wherein main current passage includes two or more electrode force application steps including a first electrode force application step and a second electrode force application step following the first electrode force application step, and an electrode force $F_1$ in the first electrode force application step and an electrode force $F_2$ in the second electrode force application step in the main current passage satisfy a relationship $F_1 > F_2$, and an electrode force switching point $T_f$ from the first electrode force application step to the second electrode force application step in the main current passage is set to satisfy the following Formulas (1) to (3):

in the case where $T_A \leq 0.8 \times T_0$, $$T_A \leq T_f < T_0 \quad (1)$$

in the case where $0.8 \times T_0 < T_A \leq T_0$ or $0.9 \times R_0 \leq R_A \leq R_0$, $$0.9 \times T_0 < T_f < 1.1 \times T_0 \quad (2)$$

in the case where $R_A < 0.9 \times R_0$, $$T_0 < T_f \leq T_0 + 2 \times (R_0 - R_A)/R_0 \times T_m \quad (3)$$

where $T_0$ is a reference electrode force switching point from the first electrode force application step to the second electrode force application step, $T_m$ is a total welding time in the main current passage, $R_A$ is a time integration value of a resistance between the electrodes from current passage start of the main current passage to the reference electrode force switching point $T_0$, $R_0$ is a time integration value of a resistance between the electrodes from current passage start to the reference electrode force switching point $T_0$ in the case where current passage is performed under a same condition as the main current passage when the parts to be welded have no disturbance, and $T_A$ is a time at which a time integration value of a resistance between the electrodes in the main current passage reaches $R_0$.

5. The resistance spot welding method according to claim 2, comprising:

performing test welding; and performing actual welding including the main current passage, after the test welding, wherein in main current passage in the test welding, a time variation curve of an instantaneous amount of heat generated per unit volume and a cumulative amount of heat generated per unit volume that are calculated from an electrical property between the electrodes in forming an appropriate nugget by performing current passage by constant current control are stored, and in the main current passage in the actual welding, the time variation curve of the instantaneous amount of heat generated per unit volume and the cumulative amount of heat generated per unit volume that are stored in the main current passage in the test welding are set as a target, and a current passage amount is controlled according to the target.

6. The weld member production method according to claim 4, wherein the reference electrode force switching point $T_0$ satisfies the following formula:

$$0.1 \times T_m \leq T_0 \leq 0.8 \times T_m.$$

7. The weld member production method according to claim 4, comprising:

performing test welding; and performing actual welding including the main current passage, after the test welding, wherein in main current passage in the test welding, a time variation curve of an instantaneous amount of heat generated per unit volume and a cumulative amount of heat generated per unit volume that are calculated from an electrical property between the electrodes in forming an appropriate nugget by performing current passage by constant current control are stored, and in the main current passage in the actual welding, the time variation curve of the instantaneous amount of heat generated per unit volume and the cumulative amount of heat generated per unit volume that are stored in the main current passage in the test welding are set as a target, and a current passage amount is controlled according to the target.

8. The weld member production method according to claim 6, comprising:

performing test welding; and performing actual welding including the main current passage, after the test welding, wherein in main current passage in the test welding, a time variation curve of an instantaneous amount of heat generated per unit volume and a cumulative amount of heat generated per unit volume that are calculated from an electrical property between the electrodes in forming an appropriate nugget by performing current passage by constant current control are stored, and in the main current passage in the actual welding, the time variation curve of the instantaneous amount of heat generated per unit volume and the cumulative amount of heat generated per unit volume that are stored in the main current passage in the test welding are set as a target, and a current passage amount is controlled according to the target.

* * * * *